Feb. 26, 1957 L. C. PETERSON ET AL 2,782,829
PNEUMATIC ARTICLE AND METHOD OF MAKING SAME
Filed April 14, 1954 2 Sheets-Sheet 2
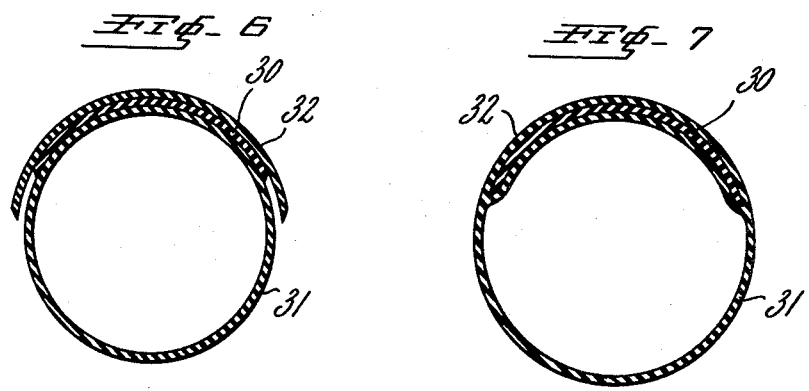
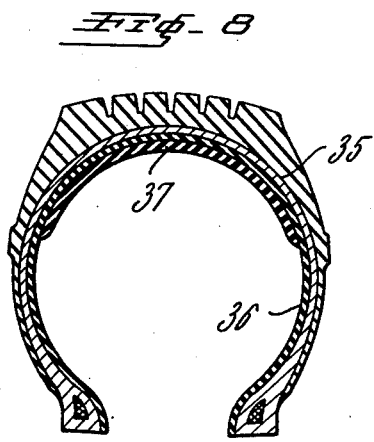
INVENTORS
LESTER C. PETERSON
HARVEY J. BATTS
BY James J. Long
AGENT United States Patent Office 2,782,829
Patented Feb. 26, 1957

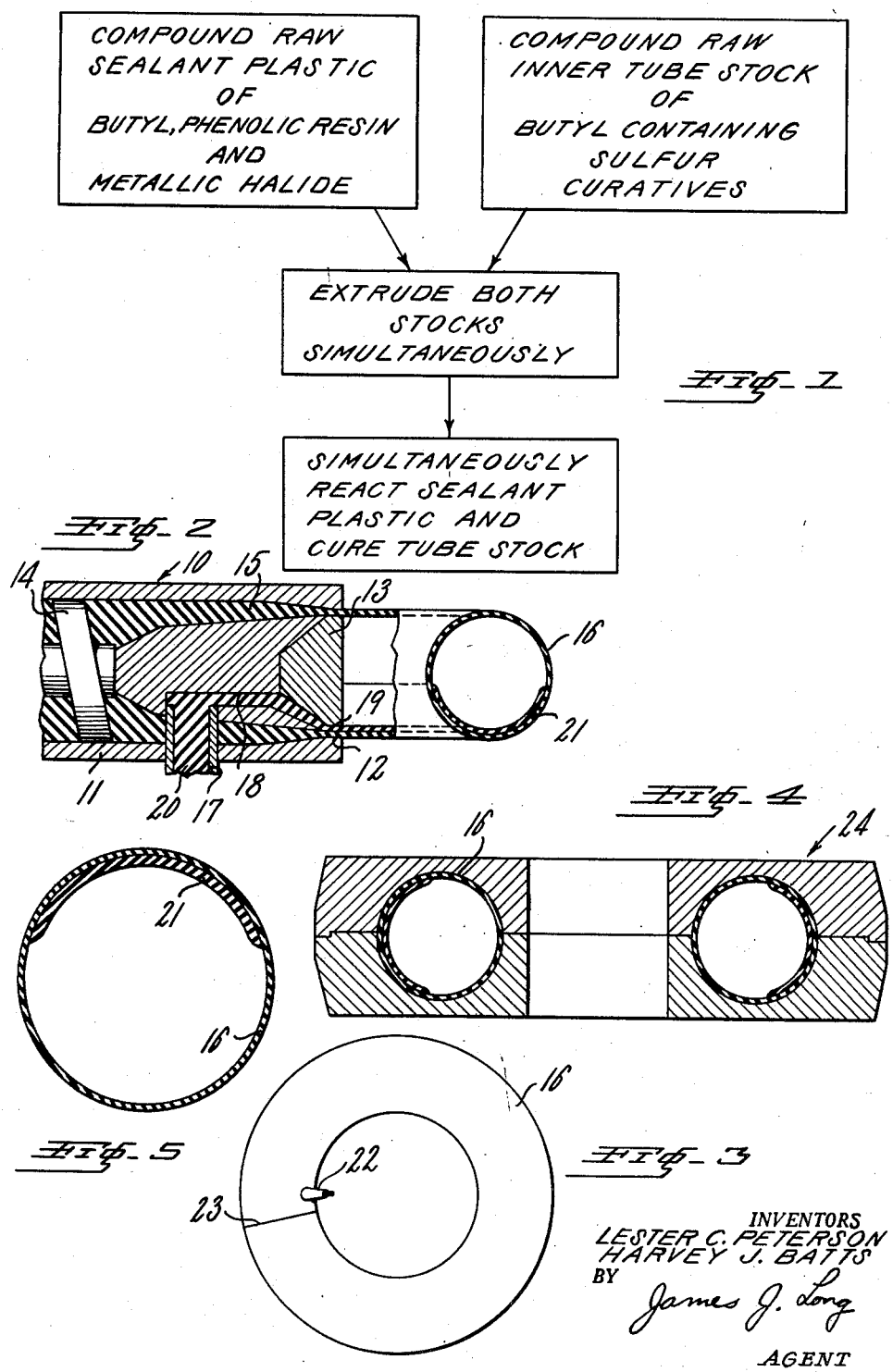

2,782,829
PNEUMATIC ARTICLE AND METHOD OF MAKING SAME

Lester C. Peterson and Harvey J. Batts, Indianapolis, Ind., assignors to United States Rubber Company, New York, N. Y., a corporation of New Jersey Application April 14, 1954, Serial No. 423,064

12 Claims. (Cl. 152—347)

This invention relates to self-sealing pneumatic articles, and, more particularly, it relates to an improved method of manufacturing inner tubes or tubeless tire casings of the puncture-sealing type, as well as to the resulting pneumatic articles.

A principal object of the present invention is to provide a method of making puncture-sealing inner tubes or tubeless tires that can be carried out more conveniently and more economically than previously known methods of making such tubes.

Another object of the invention is the provision of a method of incorporating a puncture-sealing plastic material in an inner tube that does not require any additional assembly operations over and above those ordinarily involved in inner tube practice.

It is also an object of the invention to afford an improved method of formulating a plastic sealant material for an inner tube or tubeless tire.

Still a further object of the present invention is the provision of a method of formulating a plastic sealant substance that permits such plastic to be reacted to the desired extent simultaneously with the vulcanization of the inner tube or tire.

An additional object of the invention is to provide a method of compounding and assembling a puncture-sealing layer in an inner tube or tire that does not require more than a single heating period for cure.

It is still another object of the invention to provide an improved way of simultaneously forming an inner tube and sealant layer as a unit in a single extrusion operation.

Still a further object is the provision of an inner tube or tire embodying a plastic sealant layer that does not change its plasticity substantially over prolonged periods of use.

Further objects and advantages of the invention will be made apparent in the following detailed description, which is intended to be read with reference to the accompanying drawings, wherein:

Fig. 1 is a flow diagram representing successive steps in one method of practicing the invention;

Fig. 2 is a fragmentary longitudinal sectional view showing an extruding device performing an extrusion of an inner tube with an integral plastic sealant layer, the inner tube being shown partly in full and partly in section;

Fig. 3 is a side elevational view, on a smaller scale, of a tube produced as in Fig. 2 after splicing in annular form;

Fig. 4 is a transverse sectional view, on a larger scale, of the spliced tube of Fig. 3 disposed in a vulcanizing mold;

Fig. 5 is a transverse sectional view, on a larger scale, of the completed inner tube;

Fig. 6 is a transverse sectional view of an inner tube being assembled with a sealant layer in accordance with an alternative method of practicing the invention;

Fig. 7 is a similar view of the tube of Fig. 6 after completion; and,

Fig. 8 is a transverse sectional view of a tubeless type of pneumatic tire casing made in accordance with the invention.

In practicing the invention the inner tube itself is compounded of any suitable rubber composition ordinarily used for this purpose, preferably a butyl rubber composition containing sulfur as the vulcanizing agent along with the usual auxiliary ingredients. The sealant material is compounded of butyl rubber, and contains a 2,6-dimethylol-4-substituted phenol as a modifying reagent which serves to impart to the butyl rubber a precise balance of plasticity and elasticity necessary in order for the sealant material to perform the desired puncture-sealing function satisfactorily. To facilitate the required reaction between the butyl rubber and the 2,6-dimethylol-4-substituted phenol, the sealant material is also compounded with a heavy metal halide which acts as an accelerator of the reaction.

The compounded raw inner tube stock and the compounded sealant stock, still in a raw or unreacted state, are preferably formed in the desired shape in properly assembled relation to each other, preferably by simultaneous extrusion of the two stocks. In this extrusion operation the inner tube stock takes the form of an elongated tube, with the sealant stock applied to the inner surface thereof at least over the crown area of the tube, and such tube is cut into suitable lengths and thereafter butt-spliced in annular form in the usual manner, following which the tube is vulcanized in a mold at elevated temperature. The vulcanizing cycle not only serves to cure the inner tube itself but it also serves to produce the essential reaction between the butyl rubber in the sealant layer and the 2,6-dimethylol-4-substituted phenol modifying agent, as accelerated by the heavy metal halide. The foregoing essential steps are represented diagrammatically in Fig. 1.

Although the sealant material, compounded for reaction simultaneously with the cure of the remaining vulcanizable rubber parts of the assembly, is preferably incorporated in the inner tube by a dual extrusion method that will be described in detail below, it should be understood that the method of the invention can be practiced in conjunction with other laminating procedures employed for constructing multi-layered inner tubes, as well as pneumatic tire casings of the tubeless type. Thus, the layer of raw sealant material, compounded of (A) butyl rubber, (B) 2,6-dimethylol-4-substituted phenol modifying reagent, and (C) heavy metal halide accelerator, can be shaped in the desired form by such methods as extrusion or calendering, and the thus-shaped form can be applied to the exterior crown surface of a raw inner tube, or to the surface of a raw rubber sheet of suitable size which is thereafter folded, spliced and shaped in tubular form with the sealant material on its interior crown surface. In the same way, the shaped form of compounded raw sealant material may be applied to the interior crown surface of a raw tubeless tire casing. Such application may take place on the tire building drum as the casing is being assembled, or the sealant layer may be applied after the casing is removed from the tire building drum, either while the casing is still in the form of a flat band, or after the casing has been shaped in tire form. If desired, the sealant material can first be laminated with the air-impervious layer that serves to make the tire casing impervious, and the resulting laminate can then be applied as a unit to the interior surface of casing, with the sealant either forming the exposed innermost layer, or forming a layer sandwiched in between the band ply of the casing and the air-impervious liner.

Considering now in more detail the essential ingredients used in formulating the sealant layer, and considering in particular the basic plastic ingredient, namely, the butyl rubber, this material is most commonly a copolymer of isobutylene with a small amount of isoprene. However, there may also be used in the invention any similar synthetic elastomeric copolymer made by copolymerizing an isoolefin with a minor proportion of a multi-olefinic unsaturate having from 4 to 14 carbon atoms per molecule. The isoolefins generally have frm 4 to 7 carbon atoms, and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl-butadiene-1,3; 1,2-dimethyl-butadiene-1,3; 1,3-dimethyl-butadiene-1,3; 1-ethyl-butadiene-1,3; and 1,4-dimethyl-butadiene-1,3. The butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generaly by the term butyl rubber.

The next essential ingredient of the sealant layer is the 2,6-dimethylol-4-substituted phenol used as the modifying agent to produce the desired degree of elasticity in the sealant layer. In this reagent, the 4-substituent is generally a hydrocarbon group, examples being alkyl groups, especially alkyl groups having from 3 to 20 carbon atoms, cyclo-alkyl groups, aryl groups such as phenol, and aralkyl groups such as benzyl and cumyl. Lower alkyl groups, especially those having from 4 to 8 carbon atoms, particularly tertiary-butyl and tertiary-octyl (alpha,alpha,gamma,gamma-tetramethylbutyl), constitutes the most preferred 4-substituents. Examples of suitable 2,6-dimethylol-4-substituted phenols are as follows:

2,6-dimethylol-4-methyl phenol
2,6-dimethylol-4-tertiary-butyl phenol
2,6-dimethylol-4-octyl phenol
2,6-dimethylol-4-dodecyl phenol
2,6-dimethylol-4-phenyl phenol
2,6-dimethylol-4-benzoyl phenol
2,6-dimethylol-4-(alpha,alpha-dimethyl benzoyl) phenol
2,6-dimethylol-4-cyclohexyl phenol These materials may be used either in essentially their monomeric form, or they may be used in the polymeric form, as produced by self-condensation of the 2,6-dimethylol-4-substituted phenol to yield a heat-reactive, oil-soluble, resinous product. Such resinous polymeric 2,6-dimethylol-4-substituted phenol self-condensation products are available commercially as resol resins, and they the the preferred materials for use in manufacturing the puncture-sealant from butyl rubber in accordance with the method of the invention. Mixtures of the resinous polymeric condensed 2,6-dimethylol-4-substituted phenols with more or less of low molecular weight or monomeric forms of these materials are also useful. For convenience, the term 2,6-dimethylol-4-substituted phenol will be used to refer to any of the monomeric or polymeric compounds, or to mixtures thereof, unless otherwise stated.

The amount of 2,6-dimethylol-4-substituted phenol employed is generally within the range of from 0.2 to 2.5 parts, and preferably about 0.5 to 2 parts, per 100 parts by weight of butyl rubber. It may happen that the butyl rubber will contain certain materials, incorporated therein by the manufacturer, that appear to have a definite retarding action on the reaction between the 2,6-dimethylol-4-substituted phenol and the butyl rubber. Certain amines used as stabilizing anti-oxidants, especially phenol beta-napthylamine, metallic soaps such as zinc stearate, and free fatty acids such as stearic acid, are believed to exert a retarding action, and such retarding action is most pronounced when the amount of 2,6-dimethylol-4-substituted phenol is relatively small, say from 0.2 to 1 part. Therefore, when such retarders are present in substantial amounts we prefer to employ amounts of 2,6-dimethylol-4-substituted phenol within the upper part of the recommended range and in this way we have found it possible to compensate for such retarding effect.

The third essential ingredient of the plastic sealant composition is the heavy metal halide which serves to accelerate the reaction between the butyl rubber and the 2,6-dimethylol-4-substituted phenol. The heavy metal halides suitable for this purpose are exemplified by such known stable acidic halides as tin chloride, zinc chloride, iron chloride and, in general, halides of the various metals usually classified as heavy metals (cf. the periodic chart of the elements in "Introductory College Chemistry," by H. G. Demig, published by John Wiley & Sons, Inc.). This class includes, inter alia, aluminum chloride, chromium chloride and nickel chloride, as well as cobalt chloride, manganese chloride and copper chloride. Although copper halides are capable of producing the required acceleration, we prefer not to use them because of the deleterious effect of copper on the butyl rubber in other respects. The heavy metal chlorides constitute the preferred class of accelerators for use in the invention. However, acceleration is obtainable with heavy metal salts of other halides such as aluminum bromide and stannic iodide. Heavy metal fluorides such as aluminum fluoride can accelerate, although aluminum fluoride is not particularly desirable because of its high melting point and corrosiveness. Similarly, aluminum chloride is not particularly preferred. Of the heavy metal chlorides, the most preferred are those of tin, iron and zinc. Hydrated stannous chloride and hydrated ferric chloride are especially preferred.

Only a very small amount of the heavy metal halide need be used, since they are extremely potent in their accelerating action. Thus, definite accelerating effect may be noted with as little as a tenth of a part of the heavy metal halide in 100 parts of butyl rubber, although we generally use somewhat more than this, say from 0.3 to 1 part. Larger amounts, such as 3 or 5 parts, may be used if desired, but they are usually unnecessary, and without added advantage. In any case, the heavy metal halide is employed in amount sufficient to effect definite acceleration.

When the plastic sealant material including the foregoing essential ingredients is heated at an elevated temperature such as is conventionally employed in curing an inner tube, the desired reaction between the butyl rubber and the 2,6-dimethylol-4-substituted phenol takes place at such a rate that such reaction is completed within the time that it takes the inner tube itself to be vulcanized. The ability to effect the required reaction in the sealant mixture within the ordinary inner tube vulcanizing cycle is a consequence of the employment of the heavy metal halide as an accelerator. For the purpose of the invention the vulcanization is carried out at temperatures of 200° F. or more, and preferably at temperatures in excess of 300° F., for periods of time ranging from about 4 minutes to 3 hours, the longer periods of time within the stated time range being employed with the lower temperatures. The most preferred vulcanizing temperatures are within the range of about 310° to 370° F., such temperature being maintained for from about 4 minutes to ¼ hour, although somewhat higher temperatures may be employed, e. g. 390° or 400° F., provided that such highly elevated temperatures are not maintained for a sufficiently long time to cause thermal injury to the inner tube.

To permit smooth and satisfactory compounding and processing the plastic sealant composition should include a suitable filler, capable of suppressing the nerve of the composition to a substantial extent. When suitably loaded with an appropriate filler, the modified Butyl becomes more plastic and provides a balance of elastic and plastic properties that make this material singularly well suited for use as a sealant. The fillers that may be used for this purpose may be any relatively inert, solid, finely powdered material, such as carbon black, clay, mica, calcium carbonate, precipitated hydrated silica, precipitated hydrated calcium silicate, zinc oxide, diatomaceous earth, wood flour or similar fillers known in the rubber compounding art. Usually a total of 20 to 150 parts, and preferably from about 40 to 125 parts, by weight of such filler material is employed to 100 parts of the Butyl rubber. Carbon black is a preferred filler.

It is also preferred to include in the sealant composition suitable softeners or plasticizers, preferably plasticizers of a somewhat sticky nature, to increase the tack of the material. The plasticizer should be of the kind that the skilled rubber compounder refers to as non-migratory, that is, in the final assembly, the plasticizer should have a preference for remaining within the sealant layer with which it is compounded, rather than volatize or diffuse into the material of the adjacent parts of the inner tube or tire. In this way, the properties of the sealant will be substantially maintained over a prolonged period of service life. Mineral oils, rosin oil, or other known plasticizers may be used. Preferred softeners are liquid tacky resinous materials of high molecular weight, such as polybutene (which is composed predominantly of high molecular weight monoolefins), or synthetic resins such as the paracoumarone-indene type. Such materials are well known to the skilled rubber compounder. When sufficient plasticizer is used to impart workability to the stock and to leave it in a softened condition, the mixture will be best suited to perform the sealant function. Usually from about 8 to 50 parts, and preferably from about 20 to 30 parts, of softener is sufficient for this purpose. A preferred softener is constituted of about 15 to 25 parts of polybutene and about 5 to 15 parts of paracoumarone-indene resin.

For purposes of the invention the compounded plastic sealant mix, including the recommended amounts of filler and softener, will have a Mooney viscosity within the range of from 30 to 60 (large rotor, 212° F.), and preferably from 40 to 50. During the cure of the inner tube, a chemical reaction takes place between the Butyl rubber and the 2,6-dimethylol-4-substituted phenol in the sealant layer, and such chemical reaction is accompanied by remarkable changes in the physical properties of the sealant. The sealant becomes tougher and more nervy, and increases in tensile strength and modulus, as well as in viscosity. It is also observed that during this reaction, an appreciable proportion of gel is formed in the Butyl rubber, that is, an appreciable quantity of the Butyl hydrocarbon is converted to a benzol-insoluble form. The plasticity of the sealant decreases gradually as the reaction proceeds, to a definite substantially maximum value as the 2,6-dimethylol-4-substituted phenol becomes essentially exhausted. The ultimate value of the plasticity will be determined in large part by the amount of 2,6-dimethylol-4-substituted phenol employed, although the plasticity level attained during the process will also frequently be considerably influenced by the presence or absence of other materials. For purposes of the invention, the final viscosity of the sealant layer, after the reaction of the Butyl rubber with the 2,6-dimethylol-4-substituted phenol is exhausted, will be within the range of from 40 to 70 Mooney.

The following examples will illustrate the practice of the invention in more detail. In the examples, all parts are expressed by weight.

*Example I*

To make the plastic sealant stock the following materials were first mixed in a Banbury mixer for a period of about 8 minutes:

| | Parts |
|---|---|
| GR-I 18 | 100.00 |
| Super Beckacite Resin 1003 | 1.50 |
| Thermax carbon black | 100.00 |
| Indopol H-300 | 15.00 |
| Cumar p-10 | 10.00 |
| | 226.50 |

The GR-I 18 was a commercial grade of synthetic rubber made by copolymerizing isobutylene and isoprene, and containing about 2½% of combined isoprene. The Super Beckacite Resin 1003 was a commercial resinous form of 2,6-dimethylol-4-substituted phenol, believed to be made from about 1 mole of p-octyl phenol and 2 moles of formaldehyde in an alkaline medium. The Indopol H-300 was a commercial form of polybutene, described as containing about 85–90% of high molecular weight monoolefins, the balance being isoparaffins. This material had a mean molecular weight of 940 and a Saybolt Universal viscosity at 210° F. of 3330 seconds. The Cumar p-10 was a synthetic paracoumarone-indene resin, having a softening point of from about 45° to 61° F.

The foregoing stock was then placed on a rubber mill and 0.50 part of hydrated ferric chloride ($FeCl_3 \cdot 6H_2O$) was incorporated therein to complete the raw plastic sealant mix.

There was also prepared a conventional inner tube stock made up of Butyl rubber (which has been described chemically previously in connection with the plastic sealant) containing sulfur, accelerator and other conventional compounding ingredients in the usual amounts.

The plastic sealant stock and the inner tube stock were extruded simultaneously with the aid of a dual extrusion device 10, as shown in Fig. 2, such device being made up of an extruder barrel 11 provided at its delivery end with an annular die orifice 12 defined between the outer end of the extruder and an inner core member 13 supported centrally of the extrusion passageway. A feeding screw 14 rotated by suitable means (not shown) delivers the raw inner tube stock 15 (which, it will be understood, is fed into the extruder through the usual hopper (not shown) at the entrance end of the extruder), around the central core piece 13 and through the annular diorifice 12, thereby imparting to the inner tube stock the shape of a tube 16. The extruder is also provided with an auxiliary extrusion tube 17 that extends radially through the side of the extruder into the core piece 13, which contains a forwardly extending auxiliary extrusion passageway 18 terminating at an arcuate extrusion orifice 19 superimposed within, and concentric with, a segment of the principal extrusion orifice 12. The section 19 forms, in effect, a segment of the die orifice that is relatively thicker than the remainder of the orifice, to provide for shaping of the sealant layer. An auxiliary stuffing device (not shown) serves to deliver the raw plastic sealant stock 20 through the auxiliary tube 17 and passageway 18 to the orifice 19. It will be understood that such extrusion operation is accompanied by development of an elevated temperature, caused by mechanical working of the stock within the extruder, and the apparatus is provided with the usual cooling devices (not shown) to prevent the temperature from becoming excessive. The simultaneous extrusion of the inner tube stock 15 and the sealant stock 20 in a heated plastic condition in this manner results in the formation of the raw inner tube 16 and an internal attached layer 21 of sealant, extending over that segment of the tube that is to form the crown portion of the finished inner tube. Being soft and tacky, the raw sealant stock and inner tube stock adhere to each other firmly where they are brought into contact during the dual extrusion.

The extruded inner tube 16 was thereafter provided with the usual valve stem 22 (Fig. 3) for inflating the tube, and a suitable length of the tube was butt spliced as indicated at 23 in Fig. 3 in the desired annular form.

The spliced tube was thereafter disposed in the usual vulcanizing mold 24, as shown in Fig. 4, such mold being provided with the usual heating and cooling jacket (not shown). After the tube was placed in the mold, the temperature of the mold was raised to a value of 360° F. over a period of five minutes, and the mold was maintained at this temperature for an additional period of 6½ minutes, while maintaining an air pressure of about 95 pounds in the interior of the inner tube. The mold was then cooled by circulating cold water for a period of about 9½ minutes, while still maintaining the pressure within the inner tube, after which the pressure was released and the mold was opened, and the cured inner tube, having the appearance shown in Fig. 5, was removed.

Cooling the mold in this manner before reducing the internal pressure to permit removal of the inner tube has the advantage that it prevents development of porosity in the sealant layer. The sealant layer tends to become spongy if the pressure is reduced while the inner tube is still hot.

The inner tube produced in the foregoing manner was found to be of good quality, and the sealant layer was unusually effective for sealing punctures made in the tube in use. The action of the sealant layer is such that when a nail or other puncturing object is withdrawn from the tube, a small plug or knob of the plastic sealant material tends to bulge outwardly through the opening, thereby effectively sealing off such opening and preventing the escape of air from within the inner tube. This sealant action is a consequence of the fact that the Butyl rubber in the sealant layer, as chemically modified by the phenolic resin, had a viscosity within the previously specified range of 40–70 Mooney.

In a modified practice of the invention, as illustrated in Figs. 6 and 7, a pre-formed calendered or extruded strip 30 of sealant compounded as described is applied to the exterior crown surface of a raw vulcanizable rubber inner tube 31 and an additional cover strip 32, also of raw vulcanizable rubber stock, is superimposed thereon. After cure, the assembly has the appearance shown in Fig. 7, with the sealant layer 30 sandwiched in between the tube 31 and the exterior wall 32. Alternatively, the raw sealant layer may be placed on a flat strip of raw rubber stock which is folded into tubular form and spliced to form an annular tube with the sealant layer forming an exposed surface on the interior crown of the tube, in which case the final cured tube will have the appearance shown in Fig. 5.

As indicated previously, the compounding practice of the invention can also be employed to great advantage in the construction of the tubeless type of tire casing. Fig. 8 represents such a tubeless tire, assembled in accordance with known procedures for making such tires, and including a rubberized carcass 35 provided with an air impervious inner liner 36, having a sealant layer 37 applied over its inner crown surface. It will be understood that the puncture sealant layer 37 is compounded in accordance with the invention as previously described, and assembled with the tire casing in the raw state, following which the tire is cured by heat, such curing serving not only to vulcanize the tire, but also simultaneously to react the sealant composition to the desired extent. It will also be understood that the remaining parts of the tire are made of any of the known natural or synthetic rubber compositions conventionally used for making tires. In general, the term "rubber" as used herein will be understood to comprehend either natural or synthetic rubber, unless otherwise specified, and the portions of the tube or tire, other than the sealant layer, may be composed of such rubber compounded in accordance with the conventional practices.

*Example II*

The following materials were compounded in a Banbury mixer:

|  | Parts |
| --- | --- |
| GR–I 18 | 100.00 |
| Super Beckacite Resin 1003 | 1.50 |
| Thermax carbon black | 100.00 |
| Indopol H–300 | 20.00 |
| Cumar p–10 | 5.00 |
|  | 226.50 |

The sealant stock was made by mixing 0.75 part of hydrated ferric chloride with the above mix in the Banbury, the temperature being maintained at a relatively low level to prevent premature reaction between the Butyl rubber and the resin. The mix was unloaded from the Banbury at a temperature of 220° F. The Mooney viscosity of this material was 50 (large rotor at 212° F.). This sealant stock was extruded simultaneously with a raw inner tube stock to form the inner tube by the procedure described in Example I, and the tube was cured in accordance with a temperature cycle similar to that described in Example I, except that the maximum curing temperature was 320° F., maintained for a period of eight minutes. The Linhorst plasticity (see copending application of E. F. Linhorst, Serial No. 277,779, filed March 21, 1952) of the reacted sealant material was $18 \times 10^{-3}$ inch.

In order to demonstrate the ability of the plastic sealant layer of the invention to retain the precise desired degree of plasticity even over prolonged periods of service, inner tubes made in accordance with the foregoing procedure were subjected to accelerated aging by storing them for 24 hours at a temperature of 235° F. Even after this severe aging treatment, the plasticity of the sealant layer was essentially the same as in the unaged tube, as evidenced by the following Linhorst plasticity measurements, made before and after the aging:

| Tube | Unaged | Aged 24 hrs. at 235° F. |
| --- | --- | --- |
| 1 | 21 ($\times 10^{-3}$ inch) | 24 |
| 2 | 24 | 24 |

The fact that the plasticity values did not change upon aging, within the limit of experimental error, clearly demonstrates that the resinous 2,6-dimethylol-4-substituted phenol modifying agent, used to impart the desired plasticity to the Butyl rubber, became essentially completely reacted or exhausted during the inner tube curing cycle. If any of the resin had remained unreacted, there would have been a further change in Linhorst plasticity during the aging period at elevated temperature, because the residual resin would have reacted with the Butyl, changing its plasticity. The significance of the fact that the plasticity does not change upon aging is that the inner tubes of the invention retain indefinitely the desired sealant function, consequent to the controlled plasticity of the sealant layer.

The resistance to change during aging of the present inner tubes or tires also indicates that the sealant layer of the invention is not adversely affected by the adjacent sulfur-vulcanized composition of the inner tube or tire itself. Thus, sulfur or residual curatives which migrate or diffuse from the inner tube or tire wall into the sealant layer do not have any deleterious action on the sealant plastic in the tube or tire made by the present method. This is in direct contrast to certain prior art sealant constructions, which tend to become hardened after definite periods of use, due to diffusion of curative from the inner tube or tire into the sealant material. Such hardened sealant material is of course no longer capable of efficiently performing the sealant function.

A principal advantage of the invention is that when the Butyl sealant composition is formulated with a heavy metal chloride as the accelerator, it is possible to effect the desired reaction with the 2,6-dimethylol-4-substituted phenol within the same time and temperature cycle that is required for the vulcanization of the inner tube or tire itself. Therefore, the method of the invention is particularly adaptable to manufacturing self-sealing inner tubes and tires under ordinary factory conditions. No previous or separate heating or reaction step is necessary in connection with the plastic sealant.

Because the required reaction in the plastic sealant material can be carried out concomitantly with the curing of the inner tube or tire, it is possible to assemble the raw inner tube or tire and the raw plastic sealant as a complete unit, and dispose them directly in the curing mold. When the plastic sealant material and the raw inner tube stock are assembled by a dual tubing operation in accordance with the preferred practice of the invention, the usual extra assembly operations, formerly considered necessary in the manufacture of such a composite inner tube, are eliminated, with resulting economy of operation.

The process of the invention is particularly well adapted to forming the raw inner tube and sealant as a unit by dual extrusion, because the extrusion and shrink properties of the raw sealant plastic, when compounded as recommended, are remarkably similar to the extrusion and shrink properties of ordinary raw inner tube stock, and therefore there is no difficulty about extruding the two stocks together, with good dimensional control and good adherence of the two concentric layers.

This application is a continuation-in-part of our co-pending application Serial No. 359,152, filed June 2, 1953, and now abandoned.

Having thus described our invention, what we claim and desire to protect by Letters Patent is:

1. In a method of making a self-sealing vehicle-supporting pneumatic article comprised of raw vulcanizable rubber stock, the improvement which comprises the steps of compounding an unreacted sealant material comprised of (A) 100 parts of an elastomeric copolymer of an isoolefin having from 4 to 7 carbon atoms with from 0.5 to 10% of an aliphatic conjugated diolefin having from 4 to 14 carbon atoms, (B) from 0.2 to 2.5 parts of a 2,6-dimethylol-4-hydrocarbon substituted phenol, in which the said hydrocarbon is selected from the group consisting of alkyl, cycloalkyl, aryl, and aralkyl radicals and (C) from 0.1 to 5 parts of a heavy metal halide, subsequently laminating the resulting unreacted sealant material as a sealant layer with the said raw rubber stock comprising the remainder of the assembly, and thereafter subjecting the resulting laminate to vulcanizing temperatures in a mold of desired shape for a time sufficient to cure said rubber stock and to react said sealant material simultaneously.

2. A method of making a puncture-sealing inner tube comprising in combination the steps of providing a raw vulcanizable rubber inner tube stock, compounding a raw sealant stock comprising (A) 100 parts of a rubbery copolymer of an isoolefin having from 4 to 7 carbon atoms with from 0.5 to 10% of an aliphatic conjugated diolefin having from 4 to 6 carbon atoms, (B) from 0.5 to 2.0 parts of a 2,6-dimethylol-4-lower alkyl phenol, and (C) from 0.3 to 1.0 part of a heavy metal chloride, thereafter laminating the said raw stocks with the inner tube stock in inner tube form and the sealant stock applied as a layer over the inner crown surface of the tube, and subjecting the assembly to vulcanizing temperatures in an inner tube mold for a time sufficient to cure the inner tube and react the sealant.

3. A method as in claim 2 in which the said lamination is effected by dual extrusion of the two said raw stocks.

4. A method as in claim 2 in which the said (B) ingredient is a heat-reactive, oil-soluble, resinous self-condensation product of said 2,6-dimethylol-4-lower alkyl phenol.

5. A method as in claim 4 in which the heavy metal chloride is ferric chloride.

6. A method of making a tubeless type of pneumatic tire casing comprising in combination the step of providing a raw vulcanizable rubber tire casing, applying to the interior crown surface of said casing a raw sealant stock comprising (A) 100 parts of a rubbery copolymer of an isoolefin having from 4 to 7 carbon atoms with from 0.5 to 10% of an aliphatic conjugated diolefin having from 4 to 6 carbon atoms, (B) from 0.5 to 2.0 parts of heat-reactive, oil-soluble, resinous self-condensation product of a 2,6-dimethylol-4-lower alkyl phenol, and (C) from 0.3 to 1.0 part of ferric chloride, and subsequently heating the resulting assembly in a tire mold to cure the said vulcanizable rubber casing and to react said sealant stock simultaneously.

7. A method of making a puncture-sealing inner tube comprising in combination the steps of providing a raw rubber inner tube stock comprised of a rubbery copolymer of isobutylene with from 0.5 to 5% of isoprene compounded for sulfur vulcanization, providing a raw sealant stock comprising 100 parts of said rubbery copolymer from 0.5 to 2 parts of a heat-reactive, oil-soluble, resinous self-condensation product of a 2,6-dimethylol-4-octyl phenol as a modifying reagent to render said rubbery copolymer capable of acting as a plastic sealant layer, from 0.3 to 1 part of hydrated ferric chloride as an accelerator of said modification, from 20 to 125 parts of carbon black, from 15 to 25 parts of polybutene, and from 5 to 15 parts of paracoumarone-indene resin, laminating said two raw stocks by simultaneously extruding them with the inner tube stock in the form of a tube and the sealant stock disposed as a layer on the inner crown surface of the tube, shaping the assembly in inner tube form, curing the assembly under pressure in an inner tube mold at a temperature of from 310° F. to 370° F. for from 4 minutes to ¼ hour, cooling the mold, releasing the pressure, and thereafter removing the cured inner tube containing said sealant layer on the inner crown portion, the Mooney viscosity of the said sealant layer being within the range of from 40 to 70 as a result of substantially complete reaction between the rubbery copolymer in said layer and the 2,6-dimethylol-4-octyl phenol under the influence of said hydrated ferric chloride during the said curing period.

8. In a self-sealing vehicle-supporting pneumatic article comprised of vulcanized rubber stock, the improvement which comprises a sealant layer comprised of a heat-reacted product of (A) 100 parts of an elastomeric copolymer of an isoolefin having from 4 to 7 carbon atoms with from 0.5 to 10% of an aliphatic conjugated diolefin having from 4 to 14 carbon atoms, (B) from 0.2 to 2.5 parts of a 2,6-dimethylol-4-hydrocarbon substituted phenol, in which the said hydrocarbon is selected from the group consisting of alkyl, cycloalkyl, aryl, and aralkyl radicals and (C) from 0.1 to 5 parts of a heavy metal halide.

9. A puncture-sealing inner tube comprising a vulcanized rubber envelope having in its crown area a puncture-sealing layer made up of a heat-reacted product of (A) 100 parts of an elastomeric copolymer of an isoolefin having from 4 to 7 carbon atoms with from 0.5 to 10% of an aliphatic conjugated diolefin having from 4 to 6 carbon atoms, (B) from 0.5 to 2.0 parts of a 2,6-dimethylol-4-lower alkyl phenol, and (C) from 0.3 to 1.0 part of a heavy metal chloride.

10. An inner tube as in claim 8 in which the said (B) ingredient is a heat-reactive, oil-soluble, resinous self-condensation product of said 2,6-dimethylol-4-lower alkyl phenol.

11. A tubeless type of pneumatic tire comprising in a vulcanized rubber tire casing having in its interior crown area a heat-reacted sealant layer comprising (A) 100 parts of a rubbery copolymer of an isoolefin having from 4 to 7 carbon atoms with from 0.5 to 10% of an aliphatic conjugated diolefin having from 4 to 6 carbon atoms, (B) from 0.5 to 2.0 parts of a heat-reactive, oil-soluble, resinous self-condensation product of a 2,6-dimethylol-4-lower alkyl phenol, and (C) from 0.3 to 1 part of ferric chloride.

12. A puncture-sealing inner tube comprising an air-impervious envelope of a sulfur-vulcanized rubbery copolymer of isobutylene with from 0.5 to 5% of isoprene having in its crown area a sealant layer comprising a heat-reacted product comprising 100 parts of said rubbery copolymer, from 0.5 to 2 parts of a heat-reactive, oil-soluble, resinous self-condensation product of a 2,6- dimethylol-4-octyl phenol as a modifying reagent to render said rubbery copolymer capable of acting as a plastic sealant layer, from 0.3 to 1 part of hydrated ferric chloride as an accelerator of said modification, from 20 to 125 parts of carbon black, from 15 to 25 parts of polybutene, and from 5 to 15 parts of paracoumarone-indene resin, said sealant layer having a Mooney viscosity within the range of from 40 to 70.

References Cited in the file of this patent
UNITED STATES PATENTS

| | | |
|---|---|---|
| 2,161,490 | Waber | June 6, 1939 |
| 2,163,637 | Thomas | June 27, 1939 |
| 2,283,183 | Carnahan | May 19, 1942 |
| 2,493,047 | Waber | Jan. 3, 1950 |
| 2,494,766 | Lightbown et al. | Jan. 17, 1950 |
| 2,587,470 | Herzegh | Feb. 26, 1952 |
| 2,633,177 | Waber | Mar. 31, 1953 |
| 2,649,432 | Little | Aug. 18, 1953 |